United States Patent [19]
Katoh

[11] Patent Number: 6,010,134
[45] Date of Patent: Jan. 4, 2000

[54] SEALED GROMMET FOR WIRE HARNESSES HAVING A SPLIT CYLINDRICAL CORE MEMBER WITH A COMPLEMENTARY GROMMET SLEEVE

[75] Inventor: Takahiro Katoh, Yokkaichi, Japan

[73] Assignee: Sumitomo Wiring Systems, Ltd., Japan

[21] Appl. No.: 08/399,722

[22] Filed: Mar. 7, 1995

[30] Foreign Application Priority Data

Mar. 7, 1994 [JP] Japan ..................................... 6-036113

[51] Int. Cl.⁷ ..................................................... F16J 15/00
[52] U.S. Cl. .......................... 277/615; 277/616; 277/607; 174/153 G; 174/65 G; 174/152 G
[58] Field of Search ................................ 277/4, 178, 198, 277/199, 192, 602, 607, 615, 616; 174/153 G, 65 G, 152 G, 167; 248/56; 264/262; 439/567, 604

[56] References Cited

U.S. PATENT DOCUMENTS

| | | | |
|---|---|---|---|
| 4,797,513 | 1/1989 | Ono et al. ................................. | 277/178 |
| 4,912,287 | 3/1990 | Ono et al. ................................. | 277/178 |
| 4,928,349 | 5/1990 | Oikawa et al. ...................... | 174/153 G |

FOREIGN PATENT DOCUMENTS

| | | | |
|---|---|---|---|
| 254604 | 10/1988 | Japan . | |
| 64-45420 | 3/1989 | Japan ................................. | 174/153 G |
| 406150757 | 5/1994 | Japan ................................. | 174/152 G |

*Primary Examiner*—Daniel G. DePumpo
*Attorney, Agent, or Firm*—Jordan B. Bierman; Bierman, Muserlian and Lucas

[57] ABSTRACT

A watertight grommet for a wire harness including a core made up of a pair of complementary semi cylinders which are placed together to form a complete cylinder surrounding the harness. The harness extends through the bore of the complete cylinder and is tightly retained thereby in a watertight matter. There is an enlarged inner diameter of the bore near the front end, thus forming a gap between the harness and the inner surface of the bore wherein a sealant is introduced. A cylindrical sleeve is drawn over the outside of the core to complete the seal. The latter can have a groove therein for mounting on a separator.

11 Claims, 4 Drawing Sheets

SEALED GROMMET FOR WIRE HARNESSES HAVING A SPLIT CYLINDRICAL CORE MEMBER WITH A COMPLEMENTARY GROMMET SLEEVE

This Application claims the benefit of the priority of Japanese Application 6-36113, filed Mar. 7, 1994.

The present Invention is directed to a waterproof grommet assembly intended to accommodate an elongated, substantially cylindrical object in a watertight manner. The Invention will be described specifically in terms of passing a wire harness through a separator between the passenger compartment and the exterior of an automobile, but this is done for ease of explanation and is not intended to be limiting.

BACKGROUND OF THE INVENTION

In an automobile, it is necessary that, at certain points, a wire harness extend between the exterior of the passenger compartment and the passenger compartment itself. Such harnesses are often splashed by water which can be transmitted into the passenger compartment. This causes corrosion of the mounting on the compartment side and also causes discomfort of the passengers and soiling of the mats and/or upholstery therein.

In order to deal with the foregoing problems, various waterproofing measures have been used to fix the wire harness on the wall in a watertight manner. In one such expedient, a sealant is infused in the gap between the wires and the inner surface of the grommet. Such a grommet is shown in FIGS. 7 and 8 hereof. Grommet G comprises a body which consists of enlarged diameter part 1 having receiving groove 1a and large opening 1b. Separator 5 fits into groove 1a to fix grommet G thereon. Enlarged part 1 blends into reduced diameter part 3 and is mounted on wire harness W with a gap between the internal surface of grommet G and the external surface of wire harness W. The gap is filled with sealant 3. For additional security, tape 4 is wrapped around the end of grommet G remote from large opening 1b.

The foregoing construction suffers from a number of disadvantages. Due to the large volume of expanded diameter part 1, a substantial amount of sealant 3 is necessary, thus increasing the cost of the assembly. Moreover, if curing of the sealant is started at an early stage, a danger exists that sealant 3 will set before it has an opportunity to flow into reduced diameter part 2. Therefore, assembly of grommet G places serious limitations on the stage at which curing can take place.

In an alternative prior art device as shown in FIG. 8, grommet G' is provided with reservoir 1c within large opening 1b which, in turn, is inside expanded diameter part 1. Wire harness W passes through part 1c to reduced diameter part 2 and sealant 3 flows from large opening 1b to reduced diameter part 2.

In order to apply grommets G and G' to wire harness W certain very specific steps are required. First, a bundle of wires is bound together with a tape or the like to form wire harness W. Thereafter, reduced diameter part 2 is expanded by a special jig to about 4 to 7 times its original diameter. In this condition, wire harness W is inserted into both reduced diameter part 2 and enlarged diameter part 1. Then, tape 4 is wound onto the end of reduced diameter part 2 remote from large opening 1b to fix the grommet thereon. Next the grommet is oriented so that large opening 1b faces up and sealant 3 is introduced into opening 1b or reservoir 1c. Finally, the sealant is cured.

Since the group of wires making up wire harness W extend for more than one meter on either side of the grommets, the appropriate orientation of the grommet and the subsequent introduction of the sealant are quite difficult. Moreover, in the case of grommet G' as shown in FIG. 8, expanded diameter part 1 surrounds the outer periphery of reservoir 1c and, therefore, interferes with the smooth movement of the nozzle injecting sealant 3 into the gap.

Furthermore, since it is essential that sealant 3 be introduced into the grommets after the application of tape 4, it then becomes necessary that the introduction of sealant 3 take place in the vicinity of the assembly line for harness W. This severely restricts the manufacturing operation, since it is impossible to introduce the sealant in a separate line or at a different location.

In addition to the foregoing, it has been customary to use two-liquid type sealants; such sealants cure very rapidly so that they must be introduced quickly into the grommets. It is necessary to bundle the wires, introduce them into the grommets, and wind the tape therearound before the sealant can be introduced. Since the introduction must take place at the assembly line, the operator carrying out this step can only work intermittently. This is an inefficient use of personnel. Furthermore, the necessary expansion of the diameter of the reduced diameter part (4 to 7 times) by the use of a jig necessitates additional labor and adds to the cost.

SUMMARY OF THE INVENTION

It is an object of the present Invention to overcome the problems set forth and, in particular, to permit the easy introduction of sealant into the grommet. It is also an object of the Invention to provide flexibility in manufacture so that assembly of the grommet and introduction of the sealant can take place on different assembly lines, at different times, and even at different locations. It is further an object of the present Invention to eliminate the necessity of expansion of the grommet by the use of a jig.

The present Invention comprises a watertight grommet through which the bundle of wires constituting the wire harness passes. The core of the grommet is a pair of complementary semi cylinders which, when placed together, form a complete cylinder having an axial bore from the front end through the back end. The dimensions of the complete cylinder are such that it grips the wires and is firmly affixed thereon. The front end of the core has an enlarged inner diameter portion which forms a gap between the wires and its inner surface. The sealant is introduced into this gap.

There is also provided a generally cylindrical sleeve which surrounds the complete cylinder. The inner surface of the sleeve is complementary to the external surface of the core. To mount the grommet in a correspondingly shaped opening in the separator, it has been found advantageous to provide a complementary receiving groove in the outer surface of the sleeve. The grommet is pressed into the hole until the edges thereof enter the receiving groove.

As a further feature of the Invention, a radial flange is provided on the external surface the core adjacent its front end. The back surface of the flange bears against the near end of the sleeve to aid in retaining the core within the sleeve. Preferably, the receiving groove is in the enlarged diameter part.

In another embodiment of the Invention, the external diameter of the bore tapers from the front end toward the back end. The inner surface of the sleeve is similarly tapered. This form of the device makes it easier to draw the sleeve over the core so that its near end abuts the flange on the core.

The semi cylinders are advantageously connected, in side-by-side relationship, by a hinge. Adjacent the edges of the cylinders remote from the side at which they are connected is a releasable locking device. While this device can be of many forms, it has been found advantageous to provide a projection extending outwardly of the external surface of the semi cylinder and which engages a recess adjacent the corresponding edge of the other semi cylinder. This keeps the two semi cylinders together and enables them to be separated for repair or replacement purposes.

It has been found advantageous to dimension the grommet so that the inner diameter of the sleeve is equal to or slightly smaller than the external diameter of the core. Moreover, improved results have been obtained when the core is made of resilient material and the sleeve is elastic. The two-liquid sealant is preferred, although one liquid sealer can also be used.

In operation, the semi cylinders are first placed in their open position. The wire harness is placed in one of the semi cylinders, the other is moved into the closed position, and they are locked together. Thus, the wires are gripped within the complete cylinder. Advantageously, the sealant is introduced into the front end of the completed cylinder and is allowed to penetrate into the reduced diameter part thereof. The sealant is then cured in known manner.

The sleeve is drawn over the core and the entire grommet is pressed into a hole in the separator. The pressure is continued until the periphery of the hole enters the receiving groove.

BRIEF DESCRIPTION OF THE DRAWINGS

In the accompanying drawings, constituting a part hereof, and in which like reference characters indicate like parts.

As shown in FIGS. 1 and 2, the assembly comprises core 12 enclosing wire harness W. Sleeve 11 surrounds core 12 and sealant 18 is in the gap between the inner surface of core 12 and the outer surface of wire harness W.

Figure 1:
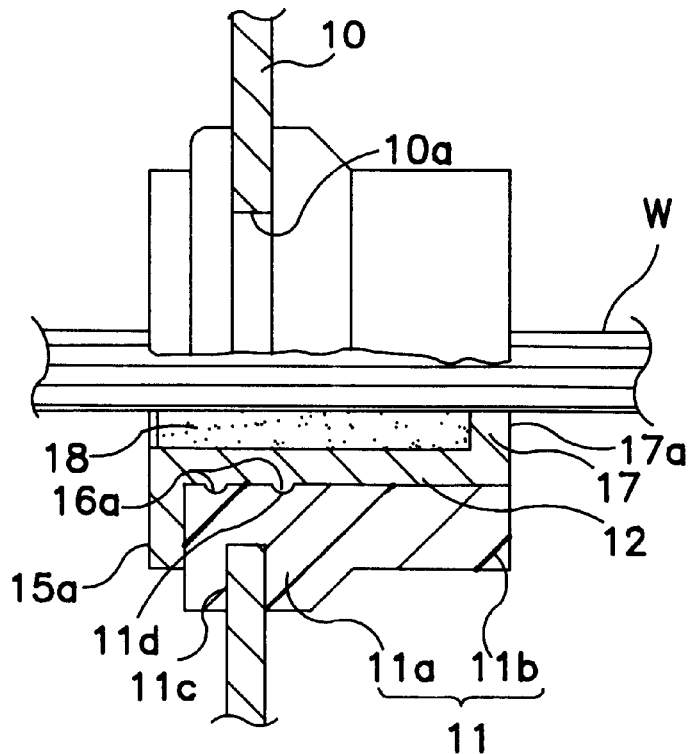
FIG. 1 is a side view, partly in section, of a grommet according to the present invention.

Core 12 is composed of semi cylinders 13a and 13b, which may be connected to each other by hinge 13c. To retain cylinders 13a and 13b in their closed position, locking projection 14a, adjacent the outer edge of semi cylinder 13a, engages recess 14b adjacent the outer edge of cylinder 13b. As an additional retention means, annular projections 16a and 16b are provided on the outer surface of cylinders 13a and 13b. These fit into corresponding grooves in the inner surface of sleeve 11.

Core 12, at its front end, is provided with radial flange 15a and sealant 18 is in the gap between the wires and core 12. The grommet is fixed on separator 10 by the periphery of hole 10a entering into receiving groove 11c.

FIG. 1 shows the near end of sleeve 11 abutting flange 15a of core 12. Since sleeve 11 is affixed to separator 10 by groove 11c, and flange 15a retains core 12 with respect to sleeve 11, core 12 is firmly mounted on separator 10. Nonetheless, if the grommet needs to be repaired or replaced, core 12 can be removed from sleeve 11 by drawing it to the left as shown in FIG. 1.

Figure 2:
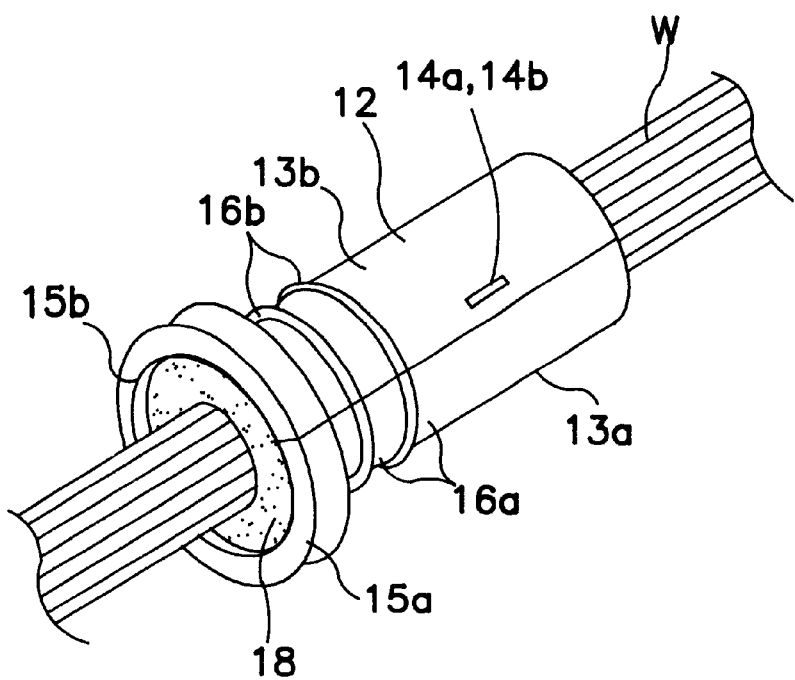
FIG. 2 is a perspective view of the grommet of FIG. 1 without the sleeve mounted thereon.
Figure 3:
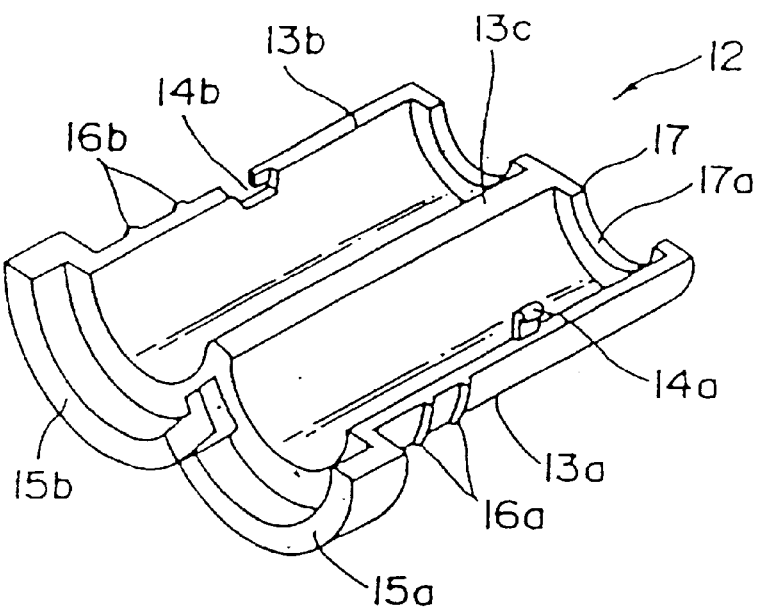
FIG. 3 is a perspective view of the semi cylinders in their open position.
Figure 4:
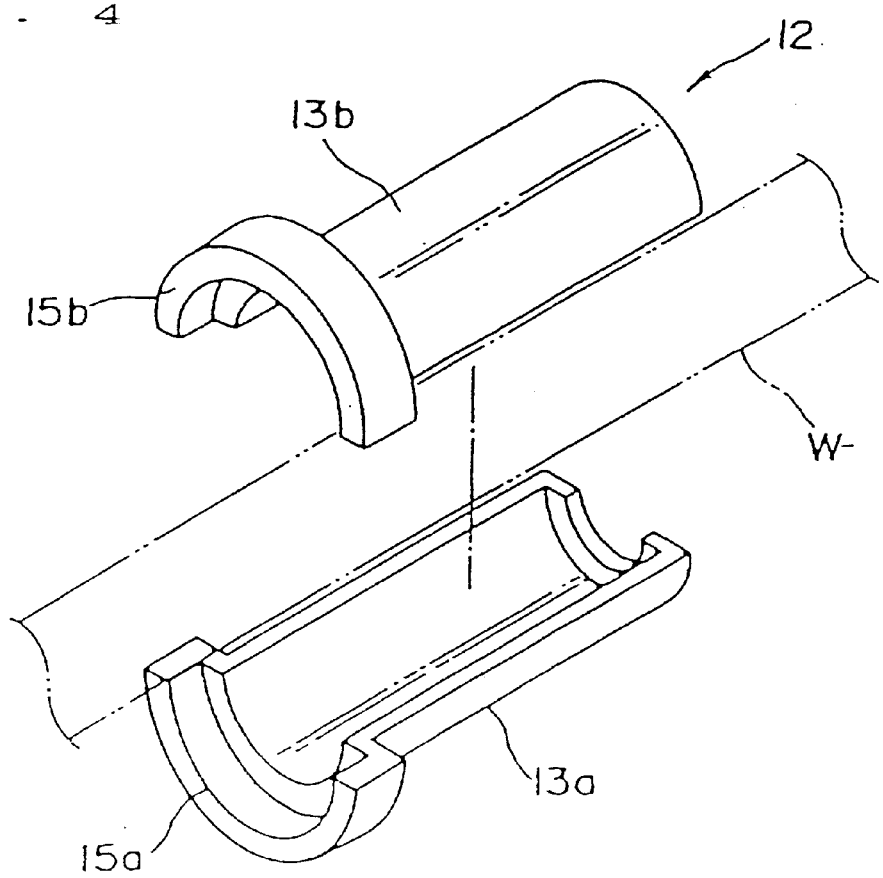
FIG. 4 is a view similar to that of FIG. 3 of the semi cylinders unattached.
Figure 5:
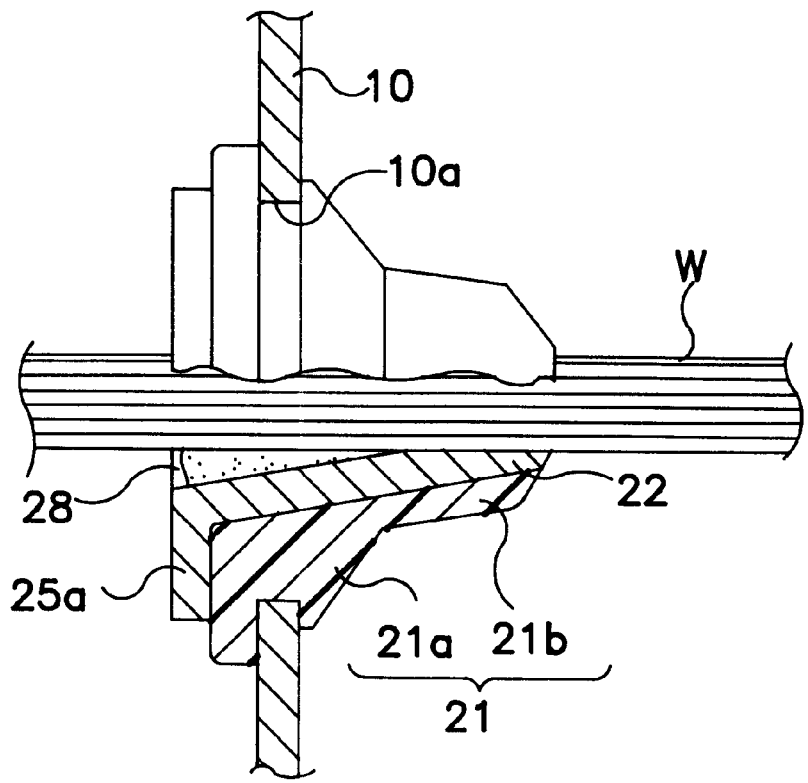
FIG. 5 is a view, similar to that of FIG. 1, of another embodiment of the Invention.
Figure 6:
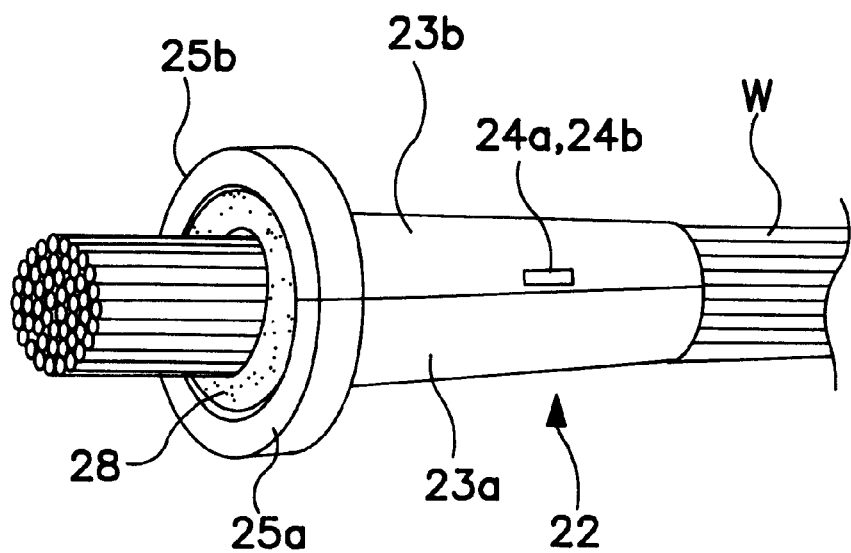
FIG. 6 is a view, similar to that of FIG. 2, of the embodiment of FIG. 5.
Figure 7:
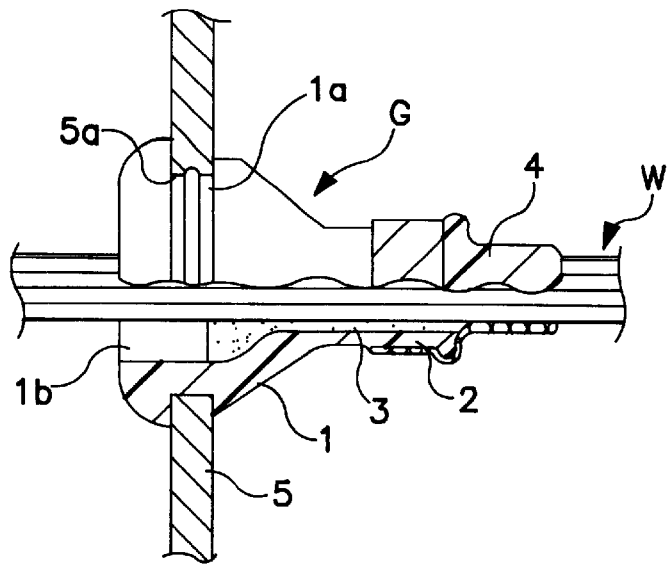
FIG. 7 is a view, similar to that of FIG. 2, of a prior art grommet.
Figure 8:
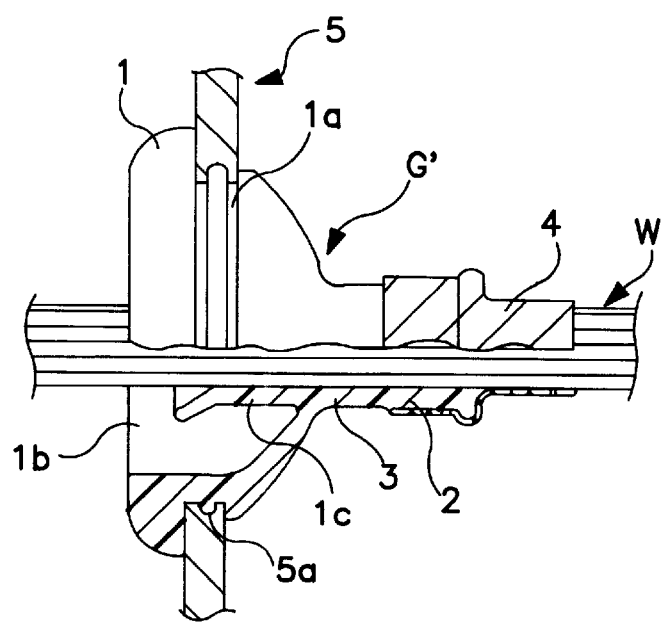
FIG. 8 is a view, similar to that of FIG. 7, of another prior art grommet.

The embodiment as shown in FIGS. 5 and 6 is similar to that of FIGS. 1 and 2. However, core 22 is tapered toward the back end of the grommet and sleeve 21 is similarly shaped. This assists in drawing sleeve 21 onto core 22.

As can be seen from the foregoing, the present Invention has a number of advantages. The mounting can be easily accomplished by sandwiching wire harness W between the semi cylinders 13a and 13b, thereby forming the complete cylinder which is core 12. It has been found preferable to make the bore of core 12 slightly smaller than the outer diameter of wire harness W, at least at back end 17. Thus, when semi cylinders 13a and 13b are combined to form the complete cylinder, wire harness W will be gripped thereby, even before sealant 18 is introduced.

Furthermore, when core 12 is oriented so that flanges 15a and 15b face upward, sealant 18 is easily introduced into the opening at the front end thereof, since only core 12 is on wire harness W. Thus, there is no interference with the sealant nozzle and the two-liquid filler, which sets rapidly, can be used without difficulty. Such a sealant permeates the gaps between the individual wires of wire harness W, as well as the gap between the outer surface of wire harness W and the inner surface of the core.

Sleeve 11 is then drawn over core 12, using an expanding jig if necessary. Flanges 15a and 15b of core 12 act as stops so that sleeve 11 can be easily and affirmatively placed in its proper position. Annular projections 16a and 16b on core 12, coupled with the corresponding grooves on sleeve 11, provide additional affirmative locking.

When the core comprises a resilient material and the sleeve is made of an elastic material (rather than both being made of elastic material), the assembly of the sleeves is made far more easily. Furthermore, when the inner diameter of the sleeve is no larger than the outer diameter of the core, the desired close contact is improved. This adds to the watertightness of the entire assembly.

The completed grommet is inserted into through hole 10a on separator 10 from left to right as shown in FIGS. 1 and 5. Insertion continues until the periphery of hole 10a enters receiving groove 11c. In this position, projection 16a and 16b, together with the corresponding grooves, assist in retaining core 12 within sleeve 11.

Modifications of the Invention such as would suggest themselves to the person of ordinary skill may be made without departing from the scope thereof. For example, the annular projections can be on the inner surface of the sleeve and the corresponding grooves in the outer surface of the core. The number of such projections may be varied to suit the needs of a particular environment in which the grommet is to be used. The sealant can be introduced in the same assembly line as the mounting of sleeve 11, or it can be done in advance on a different assembly line or even in a different location.

The use of the semi cylinders connected by a hinge makes the operation substantially more convenient. It is easier to keep track of a single part (the hinged semi cylinders) than of two parts (two independent semi cylinders). Moreover, the provision of the locking device on the sides of the semi cylinders remote from the hinge enables the core to be secured on the wire harness even before the introduction of the sealant.

The flange on the front end of the core bears against the adjacent end of the sleeve. As a result, even if a tensile force is applied to the right side of the wire harness (as shown in FIGS. 1 and 5), the flanges will hold the sleeve between the separator and the flange.

Furthermore, the tapered shape of the core and the corresponding shape of the sleeve make it very simple to draw the latter over the former. In fact, there is no need to stretch or expand the sleeve in order to force it over the core. Therefore, no jig is required and the operation can be carried out more rapidly and simply.

Because there is no sleeve on the core at the time of introduction of the sealant, it can be filled very quickly and will easily penetrate deep into the reduced diameter portion thereof. Moreover, due to the ease in handling, a fast-curing sealant can be used. These are of low viscosity and are capable of penetrating into the reduced diameter portion easily. The fast cure prevents sealant from leaking out of the back end.

Although only a limited number of specific embodiments of the present Invention have been expressly disclosed, it is, nonetheless, to be broadly construed and not to be limited except by the character of the claims appended hereto.

I claim:

1. A watertight grommet, adapted to permit at least one elongated object to extend therethrough, and adapted to be mounted on a separator, said grommet including a core comprising a pair of complementary semi-cylinders which together form a complete cylinder, said complete cylinder having a front end, a back end, an external surface, and an axial bore from said front end through said back end, said bore having an enlarged inner diameter portion adjacent said front end, thereby adapted to form a gap between said object and said portion, a sealant in said gap, a generally cylindrical sleeve having an outer surface and an inner surface, said inner surface being complementary to said external surface and said sleeve surrounding said complete cylinder, one of said inner surface and said external surface having at least one annular protuberance thereon and the other of said inner surface and said external surface having at least one annular groove complementary to said protuberances, said sleeve having a receiving groove in said outer surface adapted to cooperate with at least part of a periphery in a hole in said separator through which said grommet extends, whereby said grommet is mounted on said separator.

2. The grommet of claim 1 wherein said receiving groove comprises spaced apart side walls with a bottom therebetween, said periphery being complementary to said bottom.

3. The grommet of claim 1 comprising a radial flange on said external surface adjacent said front end, a near end of said sleeve complementary to a back surface of said flange and bearing thereagainst.

4. The grommet of claim 1 wherein said outer surface has an enlarged diameter part and a reduced diameter part, a receiving groove in said enlarged part.

5. The grommet of claim 1 wherein said bore tapers from said enlarged portion toward said back end.

6. The grommet of claim 1 wherein said semi cylinders have axes and pairs of longitudinal edges substantially parallel thereto, said semi cylinders being releasably linked at a connection at one of each said pair of said edges, said semi cylinders being adapted for movement between a closed position, wherein said complete cylinder is formed, and an open position, wherein said semi cylinders do not form said complete cylinder.

7. The grommet of claim 6 wherein said semi cylinders are connected by a hinge.

8. The grommet of claim 7 wherein, at edges of said semi cylinders remote from said hinge, there is a locking element.

9. The grommet of claim 8 wherein said locking element comprises a hook projecting out of said outer surface on one of said semi cylinders which is adapted to engage a recess in said outer surface of another of said semi cylinders.

10. The grommet of claim 1 wherein said core is of resilient material and said sleeve is of elastic material.

11. The grommet of claim 1 wherein said inner surface has a diameter which does not exceed that of said external surface.

* * * * *